Patented May 5, 1931

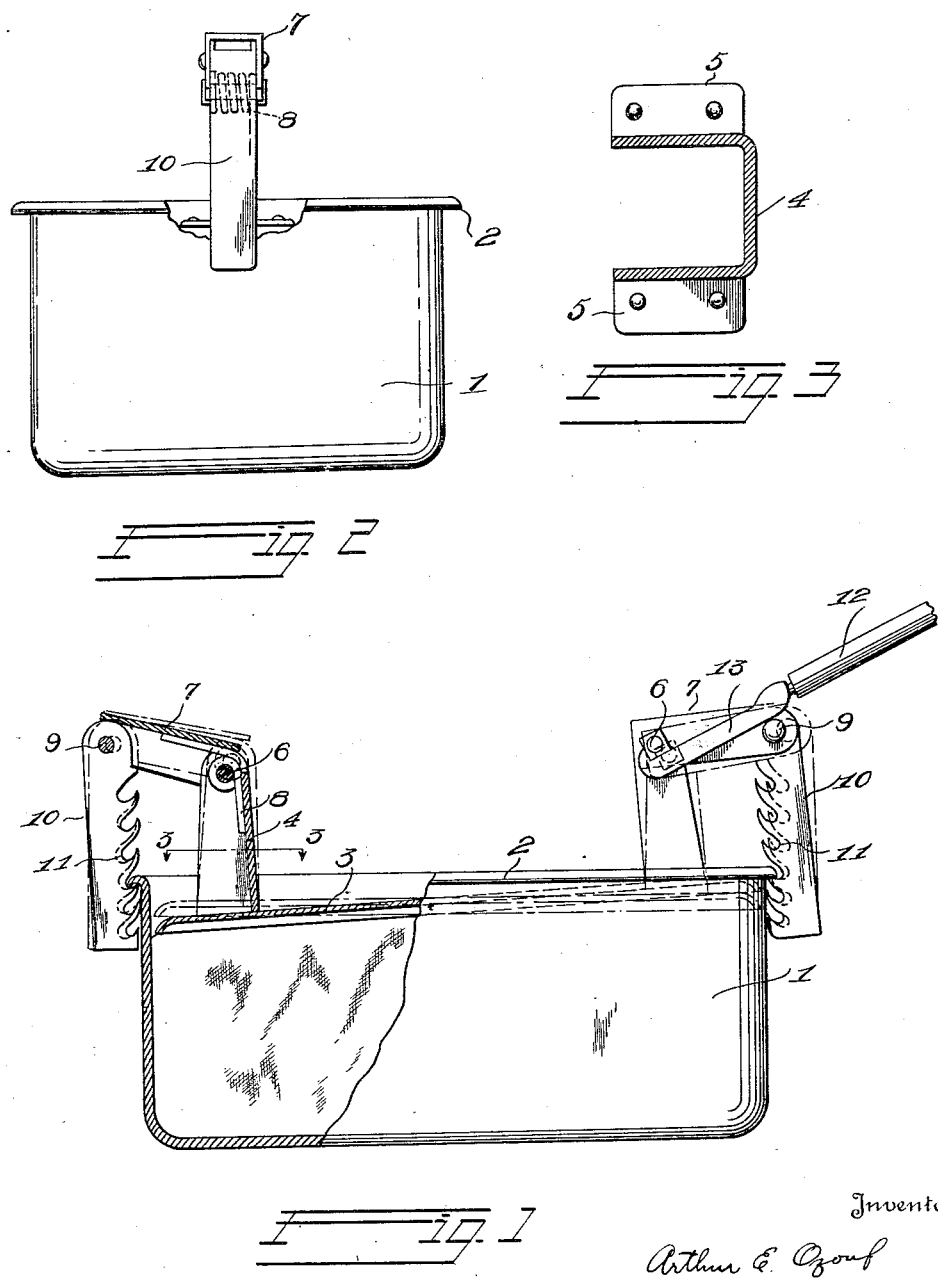

1,804,227

UNITED STATES PATENT OFFICE

ARTHUR E. OZOUF, OF CHICAGO, ILLINOIS, ASSIGNOR TO THE ALLBRIGHT-NELL COMPANY, OF CHICAGO, ILLINOIS, A CORPORATION OF ILLINOIS

APPARATUS FOR PRESSING AND COOKING MEATS

Original application filed September 3, 1925, Serial No. 54,293. Divided and this application filed April 21, 1928. Serial No. 271,776.

The present invention relates to improved apparatus for pressing and cooking meats, and this application is a division of application, Serial No. 54,293, filed September 3, 1925.

More particularly the invention relates to improved apparatus for cooking and shaping into uniform loaves, meats such as hams from which the bones have been removed or other meats, in such a way that when finished the loaves may be sliced without having the slices break at the points where incisions were made in removing bones or where the pieces of meat have been joined together.

Various forms of apparatus for producing boneless hams and meat loaves heretofore proposed have failed to maintain suitable pressures on the meat prior to and during the various stages of the cooking, with the result that the loaves produced have been more or less irregular in shape and the pieces have not been so sealed together during the process as to permit slicing of the loaves without having the slices break at the surfaces of the different pieces of meat which have been cooked together to form the loaves. Owing to this lack of proper pressure impocketed air has not been forced from the incisions and joints, the sealing of the joints and incisions has not been satisfactorily effected, and pockets of jelly have been formed in the loaves or hams. Various apparatus have been proposed for retaining the hams under pressure during the process of cooking, in which the pressure has been applied by means of springs, but owing to the nature of the proposed constructions it has been impossible to apply the heavy pressures necessary in such devices and at the same time provide for the expansion of the meat or ham in the initial stages of cooking, with the result that as the ham or meat expands a substantial portion of the juices is squeezed therefrom and is lost. In the later stages of the cooking with such prior devices, shrinkage sets in, which will depend to a large extent upon the manner in which the hams have been pickled or treated prior to the cooking, and this shrinkage is ordinarily sufficient to entirely remove the pressure from the ham or loaf, or to leave the pressure insufficient to effect the satisfactory sealing of the incisions and joints during cooking. A further defect of the prior constructions exists in the fact that an effort is made to rigidly hold the covers of the retainers or boilers in a fixed position parallel to the bottoms of the boilers or retainers, in an effort to force the loaves of meat or hams to assume the shape of the receptacle with tops and bottoms parallel. The result of this is that the pressures are localized on the thick parts of the hams or loaves while the other parts are left without suitable pressure. I have discovered that by utilizing for the boiler or receptacle a floating cover free to assume an angular position with relation to the bottom of the receptacle governed by the shape or irregularities of the loaf or ham and which is adapted to press with adequate but yielding pressure on the loaf during the cooking process, as the cooking or boiling proceeds, irregularities of the ham or meat will be pressed out and the cover will assume a position parallel to the bottom, while at the same time, sufficient pressure is maintained to produce a perfectly sealed ham of regular shape.

To effect satisfactory cooking, I have discovered that it is essential to press all of the air out of the incisions and joints, which is preferably done prior to the cooking process. This expelling of the air is effected by retaining the ham or loaf to be cooked in a receptacle under total pressure of fifty pounds or more, the most satisfactory results apparently being obtained by utilizing initial pressures ranging approximately between 100 and 250 pounds total downward pressure on receptacles containing hams and permitting the hams to stand for a period of time ranging from ten to twenty minutes or more before cooking when utilizing the improved retainer hereinafter set forth. In this way impocketed air is forced out of the loaf, water is excluded from the incisions, formation of jelly in the incisions is prevented, and a well cooked, regularly shaped loaf results. By cooling the hams or loaves throughout while still under pressures of more than fifty pounds, after cooking has been effected, I have found that the loaf or ham will set and a practically solid piece of meat is attained.

Accordingly, objects of the present invention are to provide an improved apparatus for cooking boneless hams or meat loaves by subjecting the meat to sufficient pressures applied in a manner to squeeze the air out of the pockets and incisions formed between the pieces of meat and to exclude water therefrom; to provide an apparatus for cooking boneless hams and like meat products in which the cooking is carried out under relatively heavy pressures to effect setting of the cooked meat into a solid loaf; and to provide an improved boneless ham or meat loaf in which jelly pockets are entirely eliminated, and the separate pieces of meat are sealed together so that they may be sliced across the points of sealing without breaking.

A further object of the invention is to provide improved boilers for hams and like meat loaves in which a yielding and relatively heavy pressure is applied to the meat to be cooked, by means of a floating cover which initially assumes a position at an angle with the bottom of the boiler depending upon the irregularities of the particular ham or meat loaf to be treated and maintains substantial pressures yieldingly on the ham or meat throughout the entire cooking so that the meat may expand without undue loss of juices, and is pressed into a regular shape conforming to the shape of the receptacle.

Further objects of the invention are such as may be attained by a utilization of the various principles, steps, combinations and sub-combinations hereinafter set forth and as defined by the scope of the appended claims.

As shown in the drawings:

Figure 1 is a side elevation of a preferred embodiment of the invention, shown partially in section.

Figure 2 is an end view of the form shown in Figure 1, having parts broken away.

Figure 3 is a sectional view of a supporting standard taken along line 3—3 of Figure 1.

Referring to the drawings: A receptacle 1, preferably rectangular in shape and formed of a non-corroding metal, is provided. The upper edge of the receptacle 1 is curled over to form a strengthening and cover securing bead 2. A cover 3 for receptacle 1 is provided, which is slightly smaller in size than the interior of the receptacle, so that the cover may assume various angular positions within the body of the receptacle when an irregular ham is retained therein for cooking purposes. Channel shaped standards 4 are secured adjacent the ends of cover 3 through extensions 5 by means of rivets or other suitable securing means. Pivoted to the upper ends of the standards 4 by means of pins or bolts 6 are the outwardly extending channel shaped arms 7. A helical spring 8 is wound around each of the pins 6 and the ends thereof extend into the channel sections of the standards 4 and the arms 7 in the manner shown in Figure 1. Pivotally secured to the outer ends of the arms 7 by means of the pins 9 are the rack members 10 which are provided with rack teeth 11 adapted to engage the under surface of the bead 2. A special tool 12 is preferably provided which has a jaw extension 13 adapted to hook under protruding ends of the pins or bolts 6 and to rest on the protruding ends of the pins 9 as shown in Figure 1 so that a leverage is provided whereby an operator is enabled to place springs 8 under a relatively heavy operating tension without the necessity for using a power press.

Operation

In operation of the apparatus disclosed, the bone, skin, and excess fat are first removed from the ham or meat and when cooking a ham the meat is preferably rolled in the skin and placed in the receptacle 1. The cover 3 is placed on the ham or meat and the ends of the arms 7 are then pressed downward preferably by utilizing the special tools 12, with sufficient force to apply a total initial pressure of more than 100 pounds and preferably of about 250 pounds to the cover. When the springs have been suitably forced downward to apply pressure within the limits given, the teeth 11 of the racks are forced inward and engage the under surface of the ends of the bead 2. When the meat loaf or roll has been placed under suitable pressure it is preferably permitted to stand for a period of time sufficient to permit the air to be squeezed out of the incisions or pockets in the loaf or ham made by removing the bone from the ham or by joining the pieces of meat in the loaf. With the retainer loaded in this manner, due to the irregular shape of the hams to be treated and the floating interconnections between the cover and the receptacle, the cover 3 will assume a position at an angle with the plane of the bottom of the receptacle as shown in Figure 1. This angular position of the cover will vary with the irregularity of the ham. After the ham has been permitted to rest for a suitable interval of time usually about ten or twenty minutes or more, it is placed in a low temperature cooker and cooked at a temperature ranging from 145 to 165 degrees Fahrenheit, and preferably at about 155 degrees Fahrenheit, for a period of time which will depend upon the weight of the ham being cooked, and should be about one-half an hour for each pound in weight of the ham. Because of the special construction of the retaining means for the cover, the meat will be permitted to expand in the initial stages of the cooking as the temperature rises, without substantial increase in the pressure thereon so that as the cooking proceeds, most of the juices will be retained in the ham. In the later stages of the cooking the ham will shrink to a certain degree due to the cooking and the springs 8 will then force the cover 3 downward maintaining such pressures on the ham during the entire cooking that impocketed air in the loaf is expelled, the cuts and incisions are pressed tightly together and sealed so that there is no opportunity for jelly pockets to form, and the meat is gradually forced into a solid mass conforming to the shape of the receptacle, with the plane of the cover in a plane parallel to the bottom of the receptacle. With initial pressures on the cover ranging between 240 and 250 pounds at the end of the cooking the total pressure of the cover on the cooked ham will range between 100 and 150 pounds depending upon the amount of the shrinkage of the ham.

The cooked ham is permitted to remain in the receptacle with the relatively heavy pressures maintained on the cover, and is placed in a cooling room at temperatures of 40 to 60 degrees Fahrenheit until the temperature throughout the ham or meat has been reduced to a point where the loaf sets. The time for effective cooling with the usual run of hams will range from ten to twelve hours. After the meat has been properly cooled and is set, the receptacles are heated to the point where the solidified fats and greases surrounding the loaf will be melted to allow the meat to be readily removed from the receptacle.

In this way a solid meat loaf or boneless ham without jelly formed in the incisions, and conforming to the shape of the receptacle is produced which may be cut into unbroken slices. The shape of the improved ham or loaf produced in accordance with the present invention is such that no waste in cutting off end pieces occurs, such as has been heretofore caused by the failure of hams to assume the shape of the retainers in the processes of cooking which have been heretofore used. By using a rectangular shaped receptacle, a rectangular loaf is produced.

Having described a preferred embodiment of the invention, what is desired to be secured by Letters Patent and claimed as new is:

1. Apparatus for pressing and cooking meats comprising a receptacle, a cover fitting loosely into said receptacle; arms pivotally secured to said cover and extending outward therefrom adjacent each end of said cover; resilient means tending to rotate each arm upward with relation to said cover about the securing point thereof to said cover; and means extending downward from the outer end of each arm adapted to variably engage said receptacle.

2. Apparatus for pressing and cooking meats comprising a receptacle; a cover fitting loosely into said receptacle; an arm pivotally secured to said cover adjacent each end thereof and extending outward therefrom; resilient means surrounding the pivot for each arm and tending to rotate said arms upward with relation to said cover at the securing points thereof to said cover; and means extending downward from the outer ends of said arms adapted to variably engage said receptacle.

3. In an apparatus of the class described, a receptacle, a cover slidable within said receptacle, standards rising adjacent the ends of said cover, pins extending through the upper ends of said standards, an arm pivoted on each pin, pawls pivoted to the outer ends of said arms adapted for engaging the ends of said receptacle, and coil springs on said pins, the ends of said springs being respectively extended against said arms and said standards.

4. In an apparatus of the class described, a receptacle, a cover slidably mounted in said receptacle, standards rising adjacent the ends of said cover, members pivoted to the upper ends of said standards, pawls carried by said members adapted for engaging the ends of said receptacle, coil springs supported by said standards, each coil spring having extended ends reacting against said standard and exercising a yielding leverage action between its respective standard and member.

5. In an apparatus of the class described, a receptacle, a cover slidable within said receptacle, channel shaped standards rising adjacent the ends of said cover, pivot members extending through the flanges of said channel shaped standards, channel shaped arms fitting over the upper ends of said standards and pivoted upon said pivot members, and a coil spring upon each pivot member, said coil spring having extended ends with one end bearing against the web of the adjacent standard and the other bearing against the web of the adjacent arm.

In testimony whereof I affix my signature.

ARTHUR E. OZOUF.